US009963564B2

(12) United States Patent
Imamura et al.

(10) Patent No.: US 9,963,564 B2
(45) Date of Patent: May 8, 2018

(54) MODIFIED FLUORINE-CONTAINING COPOLYMER AND FLUORINE RESIN MOLDED ARTICLE

(71) Applicant: DAIKIN INDUSTRIES, LTD., Osaka-shi, Osaka (JP)

(72) Inventors: Hitoshi Imamura, Osaka (JP); Takahisa Aoyama, Osaka (JP); Hideki Kono, Osaka (JP); Tatsuya Funaoka, Osaka (JP); Hirokazu Itou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/108,090

(22) PCT Filed: Dec. 19, 2014

(86) PCT No.: PCT/JP2014/083686
§ 371 (c)(1),
(2) Date: Jun. 24, 2016

(87) PCT Pub. No.: WO2015/104975
PCT Pub. Date: Jul. 16, 2015

(65) Prior Publication Data
US 2016/0319089 A1    Nov. 3, 2016

(30) Foreign Application Priority Data
Jan. 8, 2014   (JP) .................. 2014-002026

(51) Int. Cl.
*C08F 2/46* (2006.01)
*C08G 61/04* (2006.01)
*C08J 7/12* (2006.01)

(52) U.S. Cl.
CPC ........... *C08J 7/123* (2013.01); *C08J 2327/18* (2013.01)

(58) Field of Classification Search
CPC ............................. C08J 7/123; C08J 2327/18
USPC ......... 522/156, 155, 150, 1, 161, 157; 520/1
See application file for complete search history.

(56) References Cited

U.S. PATENT DOCUMENTS

| | | | | |
|---|---|---|---|---|
| 5,089,200 A | * | 2/1992 | Chapman, Jr. .......... | B29C 47/20 264/127 |
| 2005/0070637 A1 | | 3/2005 | Nishibayashi et al. | |
| 2007/0106026 A1 | | 5/2007 | Namura | |
| 2009/0038821 A1 | | 2/2009 | Sato et al. | |
| 2016/0322128 A1 | * | 11/2016 | Imamura ................. | C08J 3/28 |

FOREIGN PATENT DOCUMENTS

| | | |
|---|---|---|
| CN | 101364456 A | 2/2009 |
| JP | 52-98761 A | 8/1977 |
| JP | 03-505347 A | 11/1991 |
| JP | 04-501393 A | 3/1992 |
| JP | 05-057778 A | 3/1993 |
| JP | 05-502899 A | 5/1993 |
| JP | 05-214029 A | 8/1993 |
| JP | 07-037439 A | 2/1995 |
| JP | 09-245526 A | 9/1997 |
| JP | 11-049867 A | 2/1999 |
| JP | 11-349711 | * 12/1999 |
| JP | 11-349711 A | 12/1999 |
| JP | 2000-186162 A | 7/2000 |
| JP | 2002-030166 A | 1/2002 |
| JP | 2002-172702 A | 6/2002 |
| JP | 2002-327068 A | 11/2002 |
| JP | 2005-320497 A | 11/2005 |
| JP | 2007-126631 A | 5/2007 |
| JP | 2007-131671 A | 5/2007 |
| JP | 2007-137982 | * 6/2007 |
| JP | 2007-137982 A | 6/2007 |
| JP | 2008-231330 | * 10/2008 |
| JP | 2008-231330 A | 10/2008 |
| JP | 2008-231331 | * 10/2008 |
| JP | 2008-231331 A | 10/2008 |
| JP | 2010-123461 A | 6/2010 |
| JP | 2010-155443 A | 7/2010 |
| JP | 2011-105012 A | 6/2011 |
| JP | 2011-213894 A | 10/2011 |
| JP | 2014-028953 A | 2/2014 |
| WO | 1991-018930 | * 6/1990 |
| WO | 91/04842 A1 | 4/1991 |
| WO | 91/05021 A1 | 4/1991 |
| WO | 91/18930 | * 12/1991 |
| WO | 91/18930 A1 | 12/1991 |
| WO | 03/051999 A1 | 6/2003 |
| WO | 2014-007350 | * 7/2012 |
| WO | 2014/007350 A1 | 1/2014 |

OTHER PUBLICATIONS

Ikeda et al, JP 11-349711 Machine Translation Dec. 21, 1999.*
Kanega et al, JP 2007-137982 Machine Translation, Jun. 7, 2007.*
Kanega et al, JP 2008-231331 Machine Translation, Oct. 2, 2008.*
Kanega et al, JP 2008-231330 Machine Translation, Oct. 2, 2008.*
Communication dated Jun. 19, 2017 issued by the European Patent Office in counterpart European Application No. 14878221.2.
Database WPI, Week 200944, Thomson Scientific, London, GB; AN 2009-K73135, XP002770750, Jun. 25, 2009 (2 pages total).
Communication dated Jan. 12, 2017, issued by the U.S. Patent and Trademark Office in related U.S. Appl. No. 15/108,104.
English Translation of International Preliminary Report on Patentability in International Appln. No. PCT/JP2014/083680 dated Jul. 12, 2016.

(Continued)

*Primary Examiner* — Jessica Whiteley
(74) *Attorney, Agent, or Firm* — Sughrue Mion, PLLC

(57) ABSTRACT

A modified fluorine-containing copolymer obtained by irradiating a copolymer with radiation at a temperature of not higher than the melting point of the copolymer. The copolymer includes at least one copolymer selected from a copolymer including a tetrafluoroethylene unit and a perfluoro(alkyl vinyl ether) unit and a copolymer including a tetrafluoroethylene unit and a hexafluoropropylene unit, and has 10 to 10000 functional groups in total per $10^6$ carbon atoms.

10 Claims, No Drawings

(56) References Cited

OTHER PUBLICATIONS

English Translation of International Preliminary Report on Patentability in International Appln. No. PCT/JP2014/083686 dated Jul. 12, 2016.
International Search Report of PCT/JP2014/083680 dated Mar. 17, 2015.
International Search Report of PCT/JP2014/083686 dated Feb. 24, 2015.
Qiao yue chun et al., "Electric Wire and Cable Structural Design"; China Electric Power Press; Apr. 2011; p. 31, Concise statement of relevance; Cited in Decision on Refusal issued Feb. 11, 2018 for counterpart CN 201480072430.2.
Decision on Refusal for related CN Appln. No. 201480072430.2 dated Feb. 11, 2018.

\* cited by examiner

MODIFIED FLUORINE-CONTAINING COPOLYMER AND FLUORINE RESIN MOLDED ARTICLE

CROSS REFERENCE TO RELATED APPLICATIONS

This application is a National Stage of International Application No. PCT/JP2014/083686 filed Dec. 19, 2014, claiming priority based on Japanese Patent Application No. 2014-002026 filed Jan. 8, 2014, the contents of all of which are incorporated herein by reference in their entirety.

TECHNICAL FIELD

The present invention relates to modified fluorine-containing copolymers and fluororesin molded articles.

BACKGROUND ART

Fluorine-containing copolymers are excellent in properties such as heat resistance, chemical resistance, weather resistance, and stain resistance, and are used in various fields such as semiconductors, automobiles, architecture, electrics and electronics, chemical plants, and medicine-related industries.

Various methods of further improving the properties, such as heat resistance, mechanical properties, and radiation resistance, of the fluorine-containing copolymers are studied.

One known method of modifying fluorine-containing copolymers is irradiation. Commonly known examples of such a modifying method include a method in which a fluorine-containing copolymer is heated up to a temperature of not lower than the melting point thereof and then the copolymer is irradiated with radiation (Patent Literature documents 1 and 2).

If a molded article of a fluorine-containing copolymer is heated up to a temperature of not lower than the melting point of the fluorine-containing copolymer and is irradiated with radiation, the molded article is deformed unfortunately. Further, irradiation causes great deterioration of the fluororesin, failing to sufficiently provide desired mechanical properties.

Patent Literature 3 discloses a method of producing a modified fluororesin without pre-heating, including irradiating the resin with ionizing radiation having a dose rate as high as 100 kGy/sec or higher from a particle accelerator at a predetermined exposure of 200 kGy to 100 MGy to crosslink the resin, thereby easily improving the heat resistance and the chemical resistance in a short time.

Patent Literature 4 discloses that the heat-aging resistance and compression-set resistance are improved by irradiating a fluororesin heated up to 0° C. to 150° C. or up to 0° C. to the crystal dispersion temperature thereof with ionizing radiation at an exposure of 5 Gy to 500 kGy and maintaining the irradiated fluororesin at a predetermined temperature for a predetermined period of time.

Patent Literature documents 5 to 7 disclose that a tetrafluoroethylene/perfluoro(alkyl vinyl ether) copolymer having a heat of crystal fusion within a specific range or a composition containing the copolymer is irradiated with ionizing radiation of 10 kGy or higher at an irradiating condition of 100° C. or lower.

Patent Literature 8 discloses a method of producing a modified fluororesin molded article including, for example, applying a fluororesin onto a metal substrate, which is less likely to bond to the fluororesin, irradiating the fluororesin with ionizing radiation at 200° C. to 400° C. to crosslink the fluororesin, and peeling or separating the fluororesin from the substrate.

Patent Literature 9 discloses a method of producing a composite material including a crosslinked fluororesin layer having excellent abrasion resistance and adhesion with a substrate, including the steps of: forming a fluororesin layer on a substrate; heating the fluororesin layer up to a temperature within the range from the melting point of the fluororesin to the temperature 150° C. higher than the melting point and sintering the fluororesin layer; adjusting the temperature of the sintered non-crosslinked fluororesin layer to a temperature within the range from the temperature 60° C. lower than the melting point (Tm) of the fluororesin to the temperature 1° C. lower than the melting point; and irradiating the fluororesin with radiation to crosslink the fluororesin.

Patent Literature 10 discloses a material covered with a modified fluororesin including a crosslinked fluororesin film covering a substrate having thermal stability at a temperature of not lower than the melting point of the fluororesin, wherein the fluororesin is crosslinked by ionizing radiation at a temperature within the range from 250° C. to 400° C.

CITATION LIST

Patent Literature

Patent Literature 1: JP H11-49867 A
Patent Literature 2: JP 2000-186162 A
Patent Literature 3: JP H11-349711 A
Patent Literature 4: JP 2002-327068 A
Patent Literature 5: JP 2007-137982 A
Patent Literature 6: JP 2008-231330 A
Patent Literature 7: JP 2008-231331 A
Patent Literature 8: JP 2002-30166 A
Patent Literature 9: JP 2010-155443 A
Patent Literature 10: JP 2011-105012 A

SUMMARY OF INVENTION

Technical Problem

However, the fluorine-containing copolymers obtained by these conventional modifying methods still have insufficient crack resistance and heat resistance.

In consideration of the above situation, the present invention aims to provide a modified fluorine-containing copolymer and a fluororesin molded article excellent in crack resistance and heat resistance.

Solution to Problem

The inventors found that introduction of a functional group into a fluorine-containing copolymer to be irradiated enables improvement of the crack resistance and the heat resistance of the fluorine-containing polymer by irradiating the copolymer at a low temperature and a low exposure. Thereby, the inventors have completed the present invention.

Specifically, the present invention relates to a modified fluorine-containing copolymer obtained by irradiating a copolymer with radiation at a temperature of not higher than the melting point of the copolymer, the copolymer including at least one copolymer selected from the group consisting of a copolymer including a tetrafluoroethylene unit and a perfluoro(alkyl vinyl ether) unit and a copolymer including a tetrafluoroethylene unit and a hexafluoropropylene unit, and having 10 to 10000 functional groups in total per $10^6$ carbon atoms.

The functional groups preferably include at least one selected from the group consisting of —CF=CF$_2$, —CF$_2$H, —COF, —COOH, —COOCH$_3$, —CONH$_2$, and —CH$_2$OH.

The functional groups preferably include at least one selected from the group consisting of —CH$_2$CF$_2$H, —CH$_2$COF, —CH$_2$COOH, —CH$_2$COOCH$_3$, —CH$_2$CONH$_2$, and —CH$_2$OH.

The present invention also relates to a fluororesin molded article including the above modified fluorine-containing copolymer.

The molded article preferably further includes polytetrafluoroethylene.

The present invention also relates to a fluororesin molded article obtained by a method of producing a molded article including the steps of molding a copolymer and irradiating the molded copolymer with radiation, the copolymer including at least one copolymer selected from the group consisting of a copolymer including a tetrafluoroethylene unit and a perfluoro(alkyl vinyl ether) unit and a copolymer including a tetrafluoroethylene unit and a hexafluoropropylene unit, and having 10 to 10000 functional groups in total per $10^6$ carbon atoms.

The functional groups preferably include at least one selected from the group consisting of —CF=CF$_2$, —CF$_2$H, —COF, —COOH, —COOCH$_3$, —CONH$_2$, and —CH$_2$OH.

The functional groups preferably include at least one selected from the group consisting of —CH$_2$CF$_2$H, —CH$_2$COF, —CH$_2$COOH, —CH$_2$COOCH$_3$, —CH$_2$CONH$_2$, and —CH$_2$OH.

The functional groups preferably include at least one selected from the group consisting of —CH$_2$—, —CH$_3$, —CH$_2$CH$_3$, —CN, —OCH$_3$, and —SO$_3$H.

The molded article preferably further includes polytetrafluoroethylene.

Advantageous Effects of Invention

The present invention can provide a modified fluorine-containing copolymer and a fluororesin molded article excellent in crack resistance and heat resistance.

DESCRIPTION OF EMBODIMENTS

The present invention will be described in detail below.

The modified fluorine-containing copolymer of the present invention is obtained by irradiating a copolymer with radiation at a temperature of not higher than the melting point of the copolymer. The fluororesin molded article of the present invention is obtained by a method of producing a molded article including the steps of molding a copolymer and irradiating the molded copolymer with radiation.

The copolymer has 10 to 10000 functional groups per $10^6$ carbon atoms. The number of functional groups is preferably 50 or more, more preferably 100 or more, per $10^6$ carbon atoms, while the number of functional groups is preferably 9000 or less.

Too small a number of functional groups fail to sufficiently improve the crack resistance and the heat resistance of the modified fluorine-containing copolymer and the molded article. Too large a number of functional groups cause poor thermal stability. Then, the functional groups are decomposed to cause foaming of gas, and the gas remains as bubbles in a molded article. As a result, the copolymer is difficult to mold.

The functional groups include a functional group present at an end of the main chain or at an end of a side chain of the copolymer and a functional group present in the main chain or in a side chain.

The functional group present in the main chain is a functional group that directly bonds to a carbon atom of the main chain.

The functional group present in a side chain is a functional group that is present in a side chain but not at an end of the side chain.

The functional groups are each preferably a functional group present at an end of the main chain or at an end of a side chain of the copolymer.

The number of functional groups present at an end of the main chain depends on the molecular weight of the copolymer. For excellent crack resistance and thermal stability, the upper limit of the number thereof is preferably 1000, more preferably 500, per $10^6$ carbon atoms.

The number of functional groups present at an end of a side chain depends on the composition of the copolymer. For excellent crack resistance and thermal stability, the upper limit of the number thereof is preferably 10000 per $10^6$ carbon atoms.

The functional groups preferably include at least one selected from the group consisting of —CF=CF$_2$, —CF$_2$H, —COF, —COOH, —COOCH$_3$, —CONH$_2$, and —CH$_2$OH.

The functional groups more preferably include at least one selected from the group consisting of —CH$_2$CF$_2$H, —CH$_2$COF, —CH$_2$COOH, —CH$_2$COOCH$_3$, —CH$_2$CONH$_2$, and —CH$_2$OH.

The functional groups still more preferably include at least one selected from the group consisting of —CF$_2$H, —COF, —COOH, and —CH$_2$OH. The functional groups are particularly preferably —CH$_2$OH.

The functional groups may include at least one selected from the group consisting of —CH$_2$—, —CH$_3$, —CH$_2$CH$_3$, —CN, —OCH$_3$, and —SO$_3$H.

Methods of introducing the functional groups into a copolymer are known. Examples thereof include a method of using a chain-transfer agent in polymerization of monomers and a method of using a polymerization initiator for starting polymerization. If methane or ethane is used as a chain-transfer agent, —CH$_3$ or —CH$_2$CH$_3$ is introduced into an end of the main chain of the copolymer. If an alcohol is used as a chain-transfer agent, —CH$_2$OH is introduced into an end of the main chain of the copolymer. —CH$_2$OH can also be introduced into an end of the main chain of the copolymer by the use of a peroxide having a —CH$_2$OH structure as a polymerization initiator. Using a persulfate as a polymerization initiator provides a copolymer having —COOH introduced to an end of the main chain. —COOH can be converted into —CONH$_2$ by bringing this copolymer into contact with ammonia.

Any of the above functional groups can also be introduced into an end of a side chain of the copolymer by polymerizing a monomer having a functional group. The monomer having a functional group is preferably a monomer having at least one selected from the group consisting of —CF=CF$_2$, —CF$_2$H, —COF, —COOH, —COOCH$_3$, —CONH$_2$, and —CH$_2$OH, more preferably a monomer having at least one selected from the group consisting of —CH$_2$CF$_2$H, —CH$_2$COF, —CH$_2$COOH, —CH$_2$COOCH$_3$, —CH$_2$CONH$_2$, and —CH$_2$OH, still more preferably a monomer having at least one selected from the group consisting of —CF$_2$H, —COF, —COOH, and —CH$_2$OH, particularly preferably a monomer having —CH$_2$OH.

The monomer having a functional group may be a monomer having at least one selected from the group consisting of —CH$_2$—, —CH$_3$, —CH$_2$CH$_3$, —CN, —OCH$_3$, and —SO$_3$H.

The monomer having a functional group is preferably a monomer (x) represented by the following formula:

$$CX^1_2=CX^2-R_f-T$$

wherein X$^1$ and X$^2$ may be the same as or different from each other, and are each a hydrogen atom or a fluorine atom; R$_f$ is a C1-C40 divalent alkylene group, a C1-C40 fluorooxyalkylene group, a C2-C40 fluoroalkylene group having an ether bond, or a C2-C40 fluorooxyalkylene group having an ether bond; and T is any of the above functional groups.

T is preferably at least one selected from the group consisting of —CF=CF$_2$, —CF$_2$H, —COF, —COOH, —COOCH$_3$, —CONH$_2$, and —CH$_2$OH, more preferably at least one selected from the group consisting of —CH$_2$CF$_2$H, —CH$_2$COF, —CH$_2$COOH, —CH$_2$COOCH$_3$, —CH$_2$CONH$_2$, and —CH$_2$OH, still more preferably —CH$_2$OH.

T may be at least one selected from the group consisting of —CH$_3$, —CH$_2$CH$_3$, —CN, —OCH$_3$, and —SO$_3$H.

The copolymer particularly preferably has a functional group at or in all the aforementioned sites, i.e., at an end of the main chain, at an end of a side chain, in the main chain, and in a side chain. Such a copolymer can be produced by, for example, polymerizing a monomer composition containing the monomer (x) with the use of a peroxide as a polymerization initiator.

Some conventional PFAs may have such functional groups. In order to provide a molded article having high heat resistance, a copolymer having high heat resistance is usually selected. Thus, the molding temperature is high. However, molding a copolymer having a functional group at high temperature causes decomposition of the functional group. This generates problems such as foaming in a molded article and stain on a molded article. In order to suppress such problems in the case of providing a molded article having high heat resistance, usually, the functional group of the copolymer is converted into a stable functional group, and then the copolymer is molded. On the contrary to such a common technical knowledge, the inventors have found that the crack resistance and the heat resistance can be improved by positively introducing a functional group into a fluorine-containing copolymer.

Positive introduction of a functional group into a fluorine-containing copolymer enables a sufficient modifying effect even at a lower temperature and a lower exposure than conventional irradiating conditions. Thus, foaming and stain are less likely to occur after irradiation and a molded article having high heat resistance can be advantageously formed from a copolymer having relatively low heat resistance by molding even at a low temperature.

The functional groups can be identified and the number of functional groups can be determined by infrared spectroscopy.

Specifically, the number of functional groups is determined by the following method.

First, the fluorine-containing copolymer is molten at 330° C. to 340° C. for 30 minutes, and then compression-molded into a film having a thickness of 0.25 to 0.3 mm. This film is analyzed by Fourier transform infrared spectroscopy, and thereby the infrared absorption spectrum of the fluorine-containing copolymer is obtained. Then, the difference spectrum is obtained between the infrared absorption spectrum and the base spectrum of a polymer that is completely fluorinated and is free from functional groups. With the absorption peak of a specific functional group appearing in this difference spectrum, the number N of the functional groups per 1×10$^6$ carbon atoms of the fluorine-containing copolymer is calculated according to the following formula (A):

$$N=I\times K/t \qquad (A)$$

I: absorbance
K: correction coefficient
t: thickness of film (mm).

For reference, Table 1 shows the absorption frequencies, molar absorption coefficients, and correction coefficients of the functional groups mentioned herein. The molar absorption coefficients are determined from the FT-IR measurement data of a low-molecular-weight model compound.

TABLE 1

| Functional group | Absorption frequency (cm$^{-1}$) | Molar absorption coefficient (l/cm/mol) | Correction coefficient | Model compound |
| --- | --- | --- | --- | --- |
| —COF | 1883 | 600 | 388 | C$_7$F$_{15}$COF |
| —COOH free | 1815 | 530 | 439 | H(CF$_2$)$_6$COOH |
| —COOH bonded | 1779 | 530 | 439 | H(CF$_2$)$_6$COOH |
| —COOCH$_3$ | 1795 | 680 | 342 | C$_7$F$_{15}$COOCH$_3$ |
| —CONH$_2$ | 3436 | 506 | 460 | C$_7$H$_{15}$CONH$_2$ |
| —CH$_2$OH, —OH | 3648 | 104 | 2236 | C$_7$H$_{15}$CH$_2$OH |
| —CF$_2$H | 3020 | 8.8 | 26485 | H(CF$_2$CF$_2$)$_3$CH$_2$OH |
| —CF=CF$_2$ | 1795 | 635 | 366 | CF$_2$=CF$_2$ |

The absorption frequencies of —CH$_2$CF$_2$H, —CH$_2$COF, —CH$_2$COOH, —CH$_2$COOCH$_3$, and —CH$_2$CONH$_2$ are lower than the absorption frequencies of —CF$_2$H, —COF, —COOH free and —COOH bonded, —COOCH$_3$, and —CONH$_2$, shown in the table, by several tens of kaysers (cm$^{-1}$).

Thus, for example, the number of the functional groups —COF means the sum of the number of functional groups determined from the absorption peak at the absorption frequency 1883 cm$^{-1}$ assigned to —CF$_2$COF and the number of functional groups determined from the absorption peak at the absorption frequency 1840 cm$^{-1}$ assigned to —CH$_2$COF.

The copolymer is at least one copolymer selected from the group consisting of a copolymer including a tetrafluoroethylene unit (TFE unit) and a perfluoro(alkyl vinyl ether) unit (PAVE unit) (hereinafter, referred to as a TFE/PAVE copolymer) and a copolymer including a TFE unit and a hexafluoropropylene unit (HFP unit) (hereinafter, referred to as a TFE/HFP copolymer).

The PAVE constituting the TFE/PAVE copolymer may be at least one selected from the group consisting of those represented by the following formula (1):

(wherein $Y^1$ is F or $CF_3$; $R^f$ is a C1-C5 perfluoroalkyl group; p is an integer of 0 to 5; and q is an integer of 0 to 5) and those represented by the following formula (2):

(wherein Xs may be the same as or different from each other, and are each H, F, or $CF_3$; $R^1$ is a linear or branched C1-C6 fluoroalkyl group which may optionally have one or two atom(s) that is/are at least one selected from the group consisting of H, Cl, Br, and I, or a C5-C6 cyclic fluoroalkyl group which may optionally have one or two atom(s) that is/are at least one selected from the group consisting of H, Cl, Br, and I).

The copolymer including a PAVE unit can further improve the crack resistance and the heat resistance. This is presumably because a large number of large side chains, which are alkoxy groups, show a large molecular motion even at a low temperature, so that the effect of irradiation can be sufficiently achieved even at a low temperature.

The PAVE is preferably one having a bulky side chain, specifically preferably perfluoro(propyl vinyl ether) (PPVE).

The TFE/PAVE copolymer preferably includes 1.0 to 10 mass % of a polymerized unit based on PAVE in all the polymerized units.

The amount of the polymerized unit based on PAVE in all the polymerized units is more preferably 2.0 mass % or more, still more preferably 3.5 mass % or more, particularly preferably 4.0 mass % or more, most preferably 5.0 mass % or more, whereas the amount thereof is more preferably 8.0 mass % or less, still more preferably 7.0 mass % or less, particularly preferably 6.5 mass % or less, most preferably 6.0 mass % or less.

The amount of the polymerized unit based on PAVE is determined by $^{19}$F-NMR.

The TFE/PAVE copolymer preferably has a melting point of 280° C. to 322° C.

The melting point is more preferably 290° C. or higher and more preferably 315° C. or lower.

The melting point is a temperature corresponding to the maximum value on a heat-of-fusion curve obtained using a differential scanning calorimeter (DSC) at a temperature-increasing rate of 10° C./min.

The TFE/PAVE copolymer preferably has a glass transition temperature (Tg) of 70° C. to 110° C.

The glass transition temperature is more preferably 80° C. or higher and more preferably 100° C. or lower.

The glass transition temperature is a value obtained by dynamic viscoelasticity measurement.

The TFE/PAVE copolymer may be produced by any conventionally known method, such as a method in which monomers to give constitutional units of the copolymer and additives such as a polymerization initiator are appropriately mixed and the monomers are emulsion polymerized or suspension polymerized, for example.

The TFE/HFP copolymer includes a tetrafluoroethylene (TFE) unit and a hexafluoropropylene (HFP) unit.

The TFE/HFP copolymer preferably satisfies a mass ratio (TFE/HFP) between the TFE unit and the HFP unit of (70 to 99)/(1 to 30) (mass %).

The copolymer having a mass ratio within the above range can provide a modified fluororesin mixture having excellent crack resistance.

The mass ratio (TFE/HFP) is more preferably (85 to 95)/(5 to 15) (mass %).

The TFE/HFP copolymer preferably further includes a perfluoro(alkyl vinyl ether) (PAVE) unit. The copolymer further including a PAVE unit can further improve the crack resistance.

Examples of the PAVE unit contained in the TFE/HFP copolymer include the same units as for the PAVE unit constituting the above TFE/PAVE copolymer.

In order to excellently improve the crack resistance, PPVE is more preferred.

The aforementioned TFE/PAVE copolymer includes no HFP unit, and thus is different from a TFE/HFP/PAVE copolymer in this respect.

If the TFE/HFP copolymer is a copolymer including a TFE unit, a HFP unit, and a PAVE unit (hereinafter, also referred to as a "TFE/HFP/PAVE copolymer"), the mass ratio (TFE/HFP/PAVE) is preferably (70 to 99.8)/(0.1 to 25)/(0.1 to 25) (mass %). The copolymer having a mass ratio within the above range is excellent in heat resistance and chemical resistance.

The mass ratio (TFE/HFP/PAVE) is more preferably (75 to 98)/(1.0 to 15)/(1.0 to 10) (mass %).

The TFE/HFP/PAVE copolymer includes 1 mass % or more in total of the HFP unit and the PAVE unit.

The TFE/HFP/PAVE copolymer preferably includes 25 mass % or less of the HFP unit in all the monomer units. The copolymer including the HFP unit in an amount within the above range can provide a fluororesin molded article having excellent heat resistance.

The amount of the HFP unit is more preferably 20 mass % or less, still more preferably 18 mass % or less. The amount thereof is particularly preferably 15 mass % or less.

The amount of the HFP unit is preferably 0.1 mass % or more, more preferably 1 mass % or more. The amount thereof is particularly preferably 2 mass % or more.

The amount of the HFP unit can be determined by $^{19}$F-NMR.

The amount of the PAVE unit is more preferably 20 mass % or less, still more preferably 10 mass % or less. The amount thereof is particularly preferably 3 mass % or less. The amount of the PAVE unit is preferably 0.1 mass % or more, more preferably 1 mass % or more. The amount of the PAVE unit can be determined by $^{19}$F-NMR.

The TFE/HFP copolymer may further include another ethylenic monomer (a) unit.

The ethylenic monomer (a) may be any monomer unit copolymerizable with the TFE unit, the HFP unit, and the PAVE unit. Examples thereof include ethylenic fluoromonomers such as vinyl fluoride (VF), vinylidene fluoride (VdF), chlorotrifluoroethylene (CTFE), and ethylene (ETFE), and non-fluorinated ethylenic monomers such as ethylene, propylene, and alkyl vinyl ethers.

If the copolymer is a copolymer of TFE/HFP/PAVE/ethylenic monomer (a), the mass ratio (TFE/HFP/PAVE/ethylenic monomer (a)) is preferably (70 to 98)/(0.1 to 25)/(0.1 to 25)/(0.1 to 25) (mass %).

The TFE/HFP copolymer includes 1 mass % or more in total of the polymerized units other than the TFE unit.

The TFE/HFP copolymer preferably has a melting point of 200° C. to 322° C. If the melting point is lower than 200° C., the effect of irradiation may not be sufficiently achieved. If the melting point is higher than 322° C., main-chain scission may occur so that the polymer may be divided into low-molecular-weight molecules, and thus the mechanical strength may be greatly deteriorated. The melting point is more preferably 220° C. or higher, whereas the melting point is more preferably 300° C. or lower, still more preferably 280° C. or lower.

The melting point is a temperature corresponding to the maximum value on a heat-of-fusion curve obtained using a differential scanning calorimeter (DSC) at a temperature-increasing rate of 10° C./min.

The copolymer may include 0.01 to 4 mass % of the polymerized unit based on the aforementioned monomer (x) relative to the sum of the polymerized units based on the monomers other than the monomer (x).

The TFE/HFP copolymer preferably has a glass transition temperature (Tg) of 60° C. to 110° C.

The glass transition temperature is more preferably 65° C. or higher and more preferably 100° C. or lower.

The glass transition temperature is a value obtained by dynamic viscoelasticity measurement.

The TFE/HFP copolymer may be produced by any conventionally known method, such as a method in which monomers to give constitutional units of the copolymer and additives such as a polymerization initiator are appropriately mixed and the monomers are emulsion polymerized, solution polymerized or suspension polymerized, for example.

The copolymer may also preferably include the TFE/PAVE copolymer and the TFE/HFP copolymer. In other words, the TFE/PAVE copolymer and the TFE/HFP copolymer may be used in admixture. The mass ratio ((A)/(B)) between the TFE/PAVE copolymer and the TFE/HFP copolymer is preferably 1/9 to 7/3. The copolymers mixed in the ratio within the above range can provide a modified fluororesin mixture having excellent crack resistance.

The mass ratio is more preferably 5/5 to 2/8. Containing a higher proportion of the TFE/HFP copolymer, which generally has poor crack resistance, than that of the TFE/PAVE copolymer, the mixture can provide a material having the properties derived from the TFE/HFP copolymer, such as high insulation, while having greatly improved crack resistance (i.e., the crack resistance of the TFE/HFP copolymer, which has been desired to be improved, is greatly improved).

The above fluororesin mixture is preferably prepared by any known method such as a method in which two or more of the fluororesins having different melting points are melt-mixed (melt-kneaded) or a method in which resin dispersions after emulsion polymerization are mixed, the resins are coagulated with an acid such as nitric acid, and the coagulated resins are collected. The melt-mixing can be performed at a temperature of not lower than the highest melting point among the melting points of the fluororesins.

The copolymer preferably has a melt flow rate (MFR) at 372° C. of 0.1 to 100 g/10 min. The copolymer having a MFR within the above range enables a significant effect of irradiation.

The MFR is more preferably 0.5 g/10 min or more, whereas it is more preferably 80 g/10 min or less, still more preferably 40 g/10 min or less. The MFR is a value determined as the mass (g/10 min) of the polymer flowed out of a nozzle (inner diameter: 2 mm, length: 8 mm) per 10 minutes at 372° C. and 5 kg load using a melt indexer (Yasuda Seiki Seisakusho Ltd.) in conformity with ASTM D1238.

The copolymer is irradiated with radiation at a temperature of not higher than the melting point of the copolymer. The irradiation temperature is preferably lower than the temperature that is 20° C. lower than the melting point of the copolymer. The irradiation temperature is preferably 0° C. or higher, more preferably room temperature or higher, still more preferably 80° C. or higher, most preferably 100° C. or higher, whereas it is more preferably 280° C. or lower, still more preferably 200° C. or lower, most preferably 150° C. or lower.

Since the copolymer in the present invention has a functional group, a crosslinking reaction easily occurs. Thus, the crack resistance and the heat resistance can be sufficiently improved even though the irradiation is performed at a lower temperature than that of conventional irradiating conditions. As a result, even after the copolymer is molded into a desired shape, the irradiation can be performed without deformation of the molded article.

The irradiation temperature can be adjusted by any known method. Specific examples thereof include a method in which the copolymer is held in a heating furnace maintained at a predetermined temperature and a method in which the copolymer is placed on a hotplate, and then the hotplate is heated by applying an electric current to a built-in heater of the hotplate or by an external heater.

Examples of the radiation include electron beams, ultraviolet rays, gamma rays, X rays, neutron beams, and high energy ions. For excellent penetrability, a high dose rate, and suitable industrial productivity, electron beams are preferred.

The irradiation may be performed by any method, such as a method using a conventionally known irradiator.

The exposure of the radiation is preferably 5 kGy to 250 kGy. The radiation with an exposure of lower than 5 kGy may fail to sufficiently exert the effect of irradiation. The radiation with an exposure of higher than 250 kGy may cause main-chain scission so that the polymer may be divided into low-molecular-weight molecules, and thus the mechanical strength may be greatly deteriorated.

The exposure of the radiation is more preferably 10 kGy or higher, whereas it is more preferably 100 kGy or lower, still more preferably 60 kGy or lower, particularly preferably 50 kGy or lower.

The irradiation may be performed in any environment. The irradiation environment is preferably an environment having an oxygen concentration of 1000 ppm or lower, is more preferably free from oxygen, is still more preferably in vacuo or in an atmosphere of inert gas such as nitrogen, helium, or argon.

A fluororesin molded article formed from the modified fluorine-containing copolymer of the present invention is also one aspect of the present invention. The fluororesin molded article of the present invention is obtained by molding the modified fluorine-containing copolymer of the present invention. Alternatively, the fluororesin molded article may be obtained by molding the copolymer and then irradiating the resulting molded article with radiation.

A fluororesin molded article obtained by a method of producing a molded article including the steps of molding the copolymer and irradiating the molded copolymer with radiation is also one aspect of the present invention.

The modified fluorine-containing copolymer and the copolymer may be molded by any method, and examples of the molding method include any known methods such as extrusion molding, injection molding, transfer molding, inflation, and compression molding. The molding method may be appropriately selected therefrom in accordance with the shape of the target molded article.

Preferred is compression molding, injection molding, or extrusion molding. In order to easily form a minute or complicated shape, injection molding or extrusion molding is more preferred.

The extrusion molding is particularly preferably electric wire coating extrusion molding, tube extrusion molding, profile extrusion molding, film extrusion molding, or fiber extrusion molding.

In order to sell the copolymer as a material product, the copolymer needs to be in an easily handleable form, such as pellets. Pellets can be prepared by cutting an extrusion-molded strand.

The functional group in the copolymer may possibly be pyrolyzed at high temperature. A high rotational speed or a high screw compression rate in the extrusion molding conditions may cause a high shear force, possibly promoting degradation of the functional group. In order to keep the functional group, the extrusion conditions need to be such that the functional group is not pyrolyzed.

Thus, the resin temperature in molding the copolymer is preferably 430° C. or lower, more preferably 400° C. or lower, still more preferably 380° C. or lower, particularly preferably 360° C. or lower.

This condition is not a special condition but is sufficiently achievable condition in the case of a fluororesin having a melting point of 330° C. or lower.

The fluororesin molded article of the present invention may further include polytetrafluoroethylene.

Such a fluororesin molded article can be prepared by adding polytetrafluoroethylene (PTFE) to the TFE/PAVE copolymer, the TFE/HFP copolymer, or the mixture thereof.

The mixing may be achieved by any method, such as mixing of liquids each containing an emulsion-dispersed resin, mixing of liquids each containing a solution-dispersed resin, mixing of molten resins, or mixing of resin powders.

The amount of the PTFE in this case is preferably 0.01 to 60 mass %, more preferably 0.05 to 55 mass %, still more preferably 0.1 to 50 mass %, in the fluororesin mixture.

The amount of the PTFE is preferably 20 mass % or less, more preferably 5 mass % or less, still more preferably 1 mass % or less, in the fluororesin mixture.

The PTFE to be added is a TFE homopolymer or a modified PTFE containing more than 99 mass % of TFE and less than 1 mass % of a modifying monomer. Examples of the modifying monomer include hexafluoropropylene (HFP), perfluoro(alkyl vinyl ethers) (PAVE), fluoroalkyl ethylenes, and chlorotrifluoroethylene (CTFE). One modifying monomer may be used, or two or more modifying monomers may be used.

The PTFE preferably has a melting point of 315° C. to 350° C.

In the case of mixing the PTFE with the copolymer, the mixing is preferably performed by the same method as the aforementioned method of preparing a fluororesin mixture.

The fluororesin molded article of the present invention may further include any other additional components, if necessary. Examples of the additional components include the aforementioned PTFE, and additives such as a cross-linker, an antistatic, a heat-resistance stabilizer, a foaming agent, a foam nucleating agent, an antioxidant, a surfactant, a photo-polymerization initiator, an abrasion inhibitor, and a surface modifier.

The fluororesin molded article of the present invention including other components such as PTFE is preferably prepared by mixing the aforementioned copolymer with other components by a known method to provide a mixture thereof; molding the resulting mixture; and irradiating the molded mixture with radiation.

The molding may be achieved by the same method as mentioned above, and the irradiation may be achieved by the same method as mentioned above.

The fluororesin molded article of the present invention may have any shape or form, and examples thereof include pellets, a film, a sheet, a plate, a rod, a block, a cylinder, a container, an electric wire, and a tube. The fluororesin molded article is preferably in the form of a sheet or an electric wire, more preferably a sheet, because such forms severely require the crack resistance.

The above sheet preferably has a thickness of 0.01 to 10 mm.

The fluororesin molded article may be a fluororesin coat film which is a product of fluororesin paint applied so as to utilize the properties of fluororesin such as non-stickiness and heat resistance, such as coating layers on cookware, including inner pots of rice cookers, hotplates, and frying pans; and topcoat layers of fixing rollers for image-forming devices, such as electrophotographic or electrostatic copiers and laser printers.

The fluororesin molded article of the present invention may be applied to any uses, including the following:

diaphragms of diaphragm pumps, bellows molded articles, electric wire coating materials, semiconductor parts, packings and seals, thin tubes for rollers of copiers, monofilaments, belts, gaskets, optical lens parts, tubes for oil drilling, electric wires for oil drilling, electric wires for satellites, electric wires for nuclear power generation, and films for solar cell panels.

The fluororesin molded article is preferably used for any parts to be used at sites requiring the heat resistance and the resistance to crack due to repeated motions, such as diaphragms of diaphragm pumps, bellows molded articles, electric wire coating materials, and OA rollers.

Since the fluororesin molded article of the present invention can maintain its shape even at high temperature, it is also suitably used for gaskets of secondary batteries and electric double layer capacitors that generate heat during charge and discharge.

The present invention also relates to a method of producing a molded article, including the steps of molding the copolymer and irradiating the molded copolymer with radiation.

The step of molding the copolymer is preferably performed in the same manner as in the aforementioned method of molding a copolymer. The step of irradiating the molded copolymer with radiation is preferably performed in the same manner as in the aforementioned method of irradiating a copolymer with radiation.

As mentioned above, the present invention can provide a modified fluorine-containing copolymer and a fluororesin molded article having improved crack resistance and heat resistance.

EXAMPLES

Next, the present invention will be described in detail below with reference to, but not limit to, examples.

The physical properties were determined by the following methods.
(Amount of Monomer Unit)

The amounts of the respective monomer units were determined by $^{19}$F-NMR.
(MFR)

The mass (g/10 min) of the polymer flowed out of a nozzle (inner diameter: 2 mm, length: 8 mm) per 10 minutes at 372° C. and 5 kg load was determined using a melt indexer (Yasuda Seiki Seisakusho Ltd.) in conformity with ASTM D1238.
(Glass Transition Temperature)

The glass transition temperature was determined by dynamic viscoelasticity measurement using DVA-220 (IT Keisoku Seigyo K.K.).

A compression molded sheet having a length of 25 mm, a width of 5 mm, and a thickness of 0.2 mm was used as a sample specimen, and the measurement was performed at a temperature-increasing rate of 2° C./min and a frequency of 10 Hz. The temperature corresponding to the tan δ peak was defined as the glass transition temperature.

(Melting Point)

The melting point is a temperature corresponding to the maximum value on a heat-of-fusion curve obtained at a temperature-increasing rate of 10° C./rain using a differential scanning calorimeter (DSC).

(Number of Functional Groups)

A sample was molten at 330° C. to 340° C. for 30 minutes, and then compression molded into a film having a thickness of 0.25 to 0.3 mm. This film was analyzed by scanning 40 times using a Fourier transform infrared (FT-IR) spectrometer (trade name: 1760X, PerkinElmer Co., Ltd.), and thereby an infrared absorption spectrum was obtained. Then, the difference spectrum was obtained between the infrared absorption spectrum and the base spectrum of a polymer that is completely fluorinated and is free from functional groups. With the absorption peak of a specific functional group appearing in this difference spectrum, the number N of the functional group per $1 \times 10^6$ carbon atoms in the sample was calculated according to the following formula (A):

$$N = I \times K/t \quad (A)$$

I: absorbance
K: correction coefficient
t: thickness of film (mm).

For reference, Table 2 shows the absorption frequencies, molar absorption coefficients, and correction coefficients of the functional groups mentioned herein. The molar absorption coefficients are determined from the FT-IR measurement data of a low-molecular-weight model compound.

TABLE 2

| Functional group | Absorption frequency (cm$^{-1}$) | Molar absorption coefficient (l/cm/mol) | Correction coefficient | Model compound |
| --- | --- | --- | --- | --- |
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

(Crack Resistance: MIT Repetitive Folding Test (Flexibility Life))

The test was performed in conformity with ASTM D2176. Specifically, a specimen having a width of 12.5 mm and a length of 130 mm irradiated or not irradiated with electron beams was mounted on an MIT tester (model No. 12176, Yasuda Seiki Seisakusho Ltd.). The specimen was folded left and right at an angle of 135 degrees and a load of 1.25 kg, with a folding speed of 175 times/min. The number of folding until the specimen was broken (MIT repetitive number) was determined.

(Heat Resistance: Measurement of Storage Elastic Modulus (Er))

The solid viscoelasticity was determined using DVA-220 (IT Keisoku Seigyo K.K.), and thereby the storage elastic modulus (Er) was obtained. The measurement conditions were as follows. Sample: 25 mm in length, 5 mm in width, 0.2 mm in thickness, temperature-increasing rate: 5° C./rain, data-importing interval: every 1° C., frequency: 10 Hz, strain: 0.1%, static/dynamic ratio: 2, upper limit of elongation percentage: 100%, minimum load: 0.1 cN.

Based on the measurement results of the temperature and the storage elastic modulus (Er) under the aforementioned conditions, the temperature corresponding to a storage elastic modulus (Er) of 0.1 MPa or lower was determined. Here, an olefinic resin, which is a TFE copolymer, having a storage elastic modulus (Er) of 0.1 MPa or higher at a temperature of not lower than the melting point is considered to have a crosslinking structure. Thus, the storage elastic modulus was used as an indicator of heat resistance improvement.

Example 1

A tetrafluoroethylene (TFE)/perfluoro(propyl vinyl ether) (PPVE) copolymer (TFE/PPVE=94.1/5.9 (mass %), MFR: 21 g/10 min, melting point: 303° C., glass transition temperature: 93° C.) was processed into a 0.22-mm-thick sheet by a heat-press molding device, and then the sheet was cut into a strip having a width of 12.5 mm and a length of 130 mm. Thereby, a specimen was obtained.

The resulting specimen was contained in an electron beam irradiation container of an electron beam irradiator (NHV Corp.), and then nitrogen gas was put into the container so that the container was under nitrogen atmosphere. The temperature inside the container was adjusted to and stabilized at 25° C. Thereafter, the specimen was irradiated with 40 kGy of electron beams at an electron beam accelerating voltage of 3000 kV and an exposure intensity of 20 kGy/5 min.

The irradiated specimen was subjected to the storage elastic modulus measurement. Table 3 shows the result.

The number of functional groups in the copolymer (before irradiation) used in Example 1 was 191 (per 10$^6$ carbon atoms) (specifically, CH$_2$OH: 150, COF: 17, COOH: 24, other functional groups: 0).

Comparative Example 1

A specimen was obtained in the same manner as in Example 1 except that no electron beam irradiation was performed. The specimen was then subjected to the MIT repetitive folding test and the storage elastic modulus measurement. Table 3 shows the results.

Examples 2 to 4

A specimen was obtained in the same manner as in Example 1 except that the electron beam irradiation was performed at an irradiation temperature and an exposure shown in Table 3. The irradiated specimen was then subjected to the MIT repetitive folding test and the storage elastic modulus measurement. Table 3 shows the results.

Examples 5 to 8

A tetrafluoroethylene (TFE)/perfluoro(propyl vinyl ether) (PPVE) copolymer (TFE/PPVE=93.9/6.1 (mass %), MFR: 23 g/10 min, melting point: 301° C., glass transition temperature: 93° C.) was used as a copolymer material. A specimen was irradiated with electron beams in the same manner as in Example 1 except that the electron beam irradiation was performed at an irradiation temperature and an exposure shown in Table 4. The specimen irradiated with electron beams was then subjected to the MIT repetitive folding test and the storage elastic modulus measurement. Table 4 shows the results.

The number of functional groups in the copolymer (before irradiation) used in Examples 5 to 8 was 425 (per $10^6$ carbon atoms) (specifically, $CH_2OH$: 218, COF: 35, COOH: 172, other functional groups: 0).

Comparative Example 2

A specimen was obtained in the same manner as in Example 5 except that the electron beam irradiation was not performed. The specimen was then subjected to the MIT repetitive folding test and the storage elastic modulus measurement. Table 4 shows the results.

Examples 9 to 12

A tetrafluoroethylene (TFE)/perfluoro(propyl vinyl ether) (PPVE) copolymer (TFE/PPVE=93.4/6.6 (mass %), MFR: 64 g/10 min, melting point: 284° C., glass transition temperature: 90° C.) was used as a copolymer material. A specimen was irradiated with electron beams in the same manner as in Example 1 except that the electron beam irradiation was performed at an irradiation temperature and an exposure shown in Table 5. The specimen irradiated with electron beams was then subjected to the MIT repetitive folding test and the storage elastic modulus measurement. Table 5 shows the results.

The number of functional groups in the copolymer (before irradiation) used in Examples 9 to 12 was 497 (per $10^6$ carbon atoms) (specifically, $CH_2OH$: 304, COF: 17, COOH: 152, $CF_2H$: 24, other functional groups: 0).

Comparative Example 3

A specimen was obtained in the same manner as in Example 9 except that the electron beam irradiation was not performed. The specimen was then subjected to the MIT repetitive folding test and the storage elastic modulus measurement. Table 5 shows the results.

Comparative Example 4

A tetrafluoroethylene (TFE)/perfluoro(propyl vinyl ether) (PPVE) copolymer (TFE/PPVE=93.9/6.1 (mass %), MFR: 25 g/10 min, melting point: 304° C., glass transition temperature: 93° C.) with the functional groups being converted into $CF_3$ ends by fluorine gas diluted to 30 vol % with nitrogen was used as a copolymer material. A specimen was irradiated with electron beams in the same manner as in Example 1 except that the electron beam irradiation was performed at an irradiation temperature and an exposure shown in Table 6. The specimen irradiated with electron beams was then subjected to the storage elastic modulus measurement. Table 6 shows the results.

The number of functional groups in the copolymer (before irradiation) used in Comparative Example 4 was 5 (per $10^6$ carbon atoms) (specifically, $CH_2OH$: 0, COF: 5, COOH: 0, other functional groups: 0).

Comparative Example 5

A specimen was obtained in the same manner as in Comparative Example 4 except that the electron beam irradiation was not performed. The specimen was then subjected to the MIT repetitive folding test and the storage elastic modulus measurement. Table 6 shows the results.

Examples 13 and 14

A copolymer of tetrafluoroethylene (TFE), perfluoro(propyl vinyl ether) (PPVE), and perfluoro(1,1,9,9-tetrahydro-2,5-bistrifluoromethyl-3,6-dioxanonenol) (OH— and fluorine-containing allyl ether) (TFE/PPVE/OH- and fluorine-containing allyl ether=92.0/4.5/3.5 (mass %), MFR: 30 g/10 min (measurement temperature: 330° C.), melting point: 290° C., glass transition temperature: 75° C.) was used as a copolymer material. A specimen was irradiated with electron beams in the same manner as in Example 1 except that the electron beam irradiation was performed at an irradiation temperature and an exposure shown in Table 7. The specimen irradiated with electron beams was then subjected to the storage elastic modulus measurement. Table 7 shows the results.

The number of functional groups in the copolymer (before irradiation) used in Examples 13 and 14 was 8502 (per $10^6$ carbon atoms) (specifically, $CH_2OH$ at ends of side chains: 4251, —$CH_2$— in the main chain: 4251, other functional groups: 0).

Comparative Example 6

A specimen was obtained in the same manner as in Example 13 except that the electron beam irradiation was not performed. The specimen was then subjected to the storage elastic modulus measurement. Table 7 shows the results.

Examples 15 and 16

A tetrafluoroethylene (TFE)/perfluoro(propyl vinyl ether) (PPVE)/hexafluoropropylene (HFP) copolymer (TFE/PPVE/HFP=87.9/1.0/11.1 (mass %), MFR: 24 g/10 min, melting point: 257° C., glass transition temperature: 85° C.) was used as a copolymer material. A specimen was irradiated with electron beams in the same manner as in Example 1 except that the electron beam irradiation was performed at an irradiation temperature and an exposure shown in Table 8. The specimen irradiated with electron beams was then subjected to the storage elastic modulus measurement. Table 8 shows the results.

The number of functional groups in the copolymer (before irradiation) used in Examples 15 and 16 was 116 (per $10^6$ carbon atoms) (specifically, $CH_2OH$: 0, COF: 6, COOH: 10, $CF_2H$: 100, other functional groups: 0).

Comparative Example 7

A specimen was obtained in the same manner as in Example 15 except that no electron beam irradiation was performed. The specimen was then subjected to the storage elastic modulus measurement. Table 8 shows the results.

TABLE 3

| | Irradiation temperature (° C.) | Exposure (kGy) | Flexibility life (MIT) (times) | Temperature corresponding to storage elastic modulus (Er) of 0.1 MPa or lower |
|---|---|---|---|---|
| Comparative Example 1 | — | Not irradiated | 55,601 | 300° C. or lower |
| Example 1 | 25 | 40 | Not measured | 305° C. or higher |
| Example 2 | 80 | 40 | Not measured | 310° C. or higher |
| Example 3 | 200 | 20 | 125,738 | 340° C. or higher |
| Example 4 | 200 | 60 | Not measured | 350° C. or higher |

TABLE 4

| | Irradiation temperature (° C.) | Exposure (kGy) | Flexibility life (MIT) (times) | Temperature corresponding to storage elastic modulus (Er) of 0.1 MPa or lower |
|---|---|---|---|---|
| Comparative Example 2 | — | Not irradiated | 45,000 | 300° C. or lower |
| Example 5 | 245 | 10 | 176,926 | 345° C. or higher |
| Example 6 | 245 | 20 | 292,270 | 350° C. or higher |
| Example 7 | 245 | 40 | 398,896 | 360° C. or higher |
| Example 8 | 245 | 50 | 439,444 | 360° C. or higher |

TABLE 5

| | Irradiation temperature (° C.) | Exposure (kGy) | Flexibility life (MIT) (times) | Temperature corresponding to storage elastic modulus (Er) of 0.1 MPa or lower |
|---|---|---|---|---|
| Comparative Example 3 | — | Not irradiated | 6,861 | 295° C. or lower |
| Example 9 | 200 | 20 | 14,862 | 340° C. or higher |
| Example 10 | 200 | 60 | 10,961 | 350° C. or higher |
| Example 11 | 245 | 10 | 21,683 | 350° C. or higher |
| Example 12 | 245 | 20 | 28,213 | 350° C. or higher |

TABLE 6

| | Irradiation temperature (° C.) | Exposure (kGy) | Flexibility life (MIT) (times) | Temperature corresponding to storage elastic modulus (Er) of 0.1 MPa or lower |
|---|---|---|---|---|
| Comparative Example 4 | 200 | 60 | Not measured | 305° C. or lower |
| Comparative Example 5 | — | Not irradiated | 28,901 | 300° C. or lower |

TABLE 7

| | Irradiation temperature (° C.) | Exposure (kGy) | Flexibility life (MIT) (times) | Temperature corresponding to storage elastic modulus (Er) of 0.1 MPa or lower |
|---|---|---|---|---|
| Comparative Example 6 | — | Not irradiated | Not measured | 295° C. or lower |
| Example 13 | 80 | 20 | Not measured | 330° C. or higher |
| Example 14 | 150 | 40 | Not measured | 370° C. or higher |

TABLE 8

| | Irradiation temperature (° C.) | Exposure (kGy) | Flexibility life (MIT) (times) | Temperature corresponding to storage elastic modulus (Er) of 0.1 MPa or lower |
|---|---|---|---|---|
| Comparative Example 7 | — | Not irradiated | Not measured | 260° C. or lower |
| Example 15 | 180 | 130 | Not measured | 290° C. or higher |
| Example 16 | 245 | 150 | Not measured | 290° C. or higher |

The results of the examples and the comparative examples prove that the molded articles obtained by irradiating a copolymer having a functional group with radiation each have a higher MIT value and have a storage elastic modulus of 0.1 MPa or lower at a higher temperature.

INDUSTRIAL APPLICABILITY

The modified fluorine-containing copolymer and the fluororesin molded article of the present invention can be suitably applied to various uses requiring crack resistance and heat resistance such as gaskets of secondary batteries.

The invention claimed is:

1. A modified fluorine-containing copolymer obtained by irradiating a copolymer with radiation at a temperature of not higher than the melting point of the copolymer,
    the copolymer including at least one copolymer selected from the group consisting of a copolymer including a tetrafluoroethylene unit and a perfluoro(alkyl vinyl ether) unit and a copolymer including a tetrafluoroethylene unit and a hexafluoropropylene unit, and having 10 to 10000 functional groups in total per $10^6$ carbon atoms wherein the functional groups are present at an end of the main chain of the copolymer.

2. The modified fluorine-containing copolymer according to claim 1,
    wherein the functional groups include at least one selected from the group consisting of —CF=CF$_2$, —CF$_2$H, —COF, —COOH, —COOCH$_3$, —CONH$_2$, and —CH$_2$OH.

3. The modified fluorine-containing copolymer according to claim 1,
    wherein the functional groups include at least one selected from the group consisting of —CH$_2$CF$_2$H, —CH$_2$COF, —CH$_2$COOH, —CH$_2$COOCH$_3$, —CH$_2$CONH$_2$, and —CH$_2$OH.

4. A fluororesin molded article comprising the modified fluorine-containing copolymer according to claim 1.

5. The fluororesin molded article according to claim 4, further comprising polytetrafluoroethylene.

6. A fluororesin molded article obtained by a method of producing a molded article including the steps of molding a copolymer and irradiating the molded copolymer with radiation, the copolymer including at least one copolymer selected from the group consisting of a copolymer including a tetrafluoroethylene unit and a perfluoro(alkyl vinyl ether) unit and a copolymer including a tetrafluoroethylene unit and a hexafluoropropylene unit, and having 10 to 10000 functional groups in total per $10^6$ carbon atoms wherein the functional groups are present at an end of the main chain of the copolymer.

7. The fluororesin molded article according to claim 6, wherein the functional groups include at least one selected from the group consisting of —CF=CF$_2$, —CF$_2$H, —COF, —COOH, —COOCH$_3$, —CONH$_2$, and —CH$_2$OH.

8. The fluororesin molded article according to claim 6, wherein the functional groups include at least one selected from the group consisting of —CH$_2$CF$_2$H, —CH$_2$COF, —CH$_2$COOH, —CH$_2$COOCH$_3$, —CH$_2$CONH$_2$, and —CH$_2$OH.

9. The fluororesin molded article according to claim 6, wherein the functional groups include at least one selected from the group consisting of —CH$_2$—, —CH$_3$, —CH$_2$CH$_3$, —CN, —OCH$_3$, and —SO$_3$H.

10. The fluororesin molded article according to claim 6, further comprising polytetrafluoroethylene.

* * * * *